Figure 1:
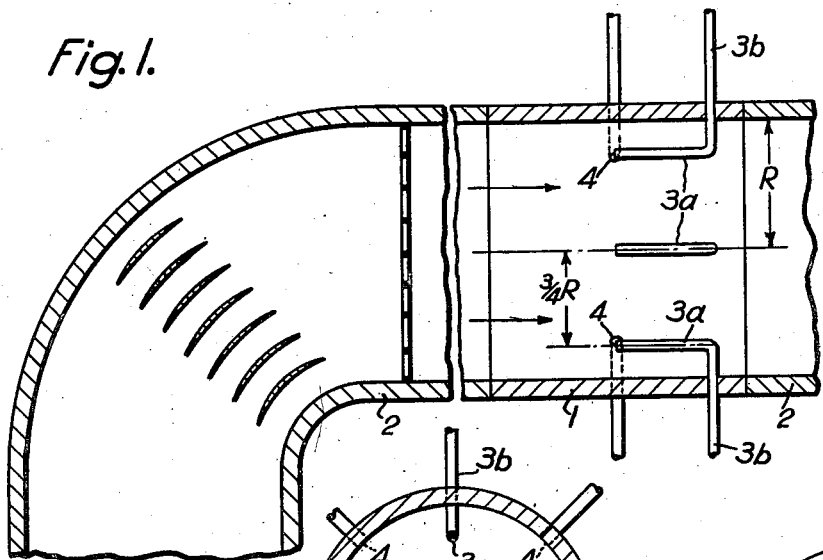

April 19, 1955   J. H. PRESTON   2,706,409
FLOW METER
Filed Nov. 24, 1950

INVENTOR
John Henry Preston
BY
ATTORNEY

United States Patent Office 2,706,409
Patented Apr. 19, 1955

2,706,409

FLOW METER

Joseph Henry Preston, Cambridge, England

Application November 24, 1950, Serial No. 197,185

7 Claims. (Cl. 73—212)

This invention relates to Pitot-tube type flow meters for measuring the flow of gaseous fluids or liquids of low viscosity in pipe lines. Pitot-tube type meters have the great practical merits of simplicity and of causing no loss in head, but the usual arrangement in which the Pitot head is placed on the axis of the pipe has the disadvantage that its calibration depends on the Reynolds number, because the ratio of the mean velocity to the velocity on the axis is a function of the Reynolds number. It has the further disadvantage that it is not reliable where asymmetry exists in the velocity distribution across different diameters of the pipe, because then a change of velocity on the axis need not necessarily indicate a change of flux, and accordingly a considerable settling length of pipe must be used so as to ensure that the flow has become symmetrical at the Pitot head.

An object of the invention is to provide a Pitot tube flow meter in which the calibration is practically independent of the Reynolds number. A further object is to provide a Pitot tube flow meter in which the sensitivity is high. Yet another object is to provide a Pitot tube flow meter in which inaccuracies due to asymmetrical velocity distribution across different diameters of the pipe are reduced, and in which if desired such asymmetry can be detected.

The features of the invention whereby these and other objects are achieved will now be described, reference being had to the accompanying drawings illustrative thereof. For convenience in illustration these drawings are somewhat diagrammatic in character.

Figure 2:
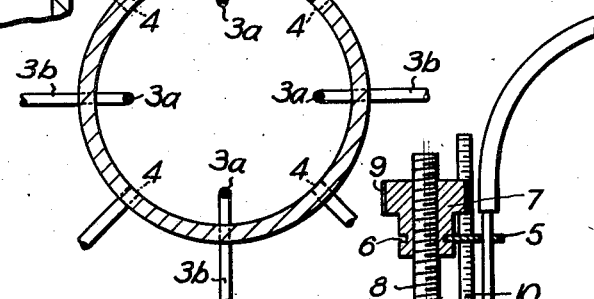
Figure 3:
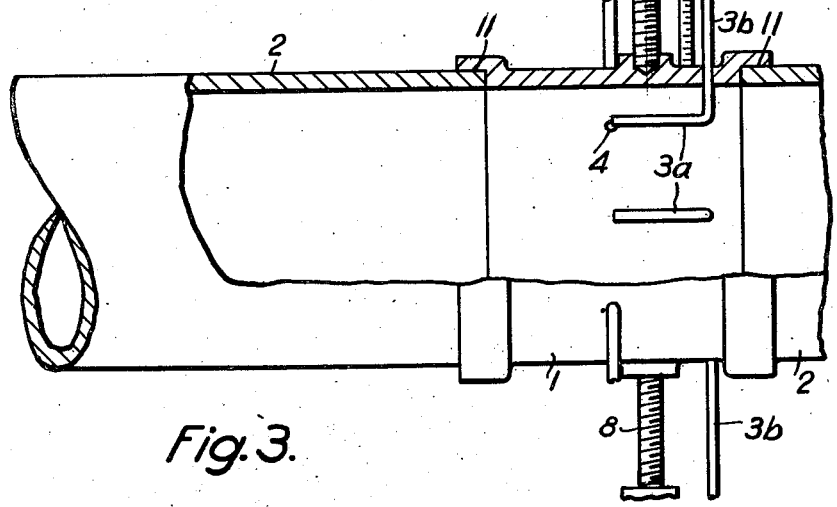

In the drawings:

Figure 1 is a longitudinal sectional view, and Figure 2 is a corresponding cross section, of a simple form of flow meter according to the invention, and Figure 3 is a longitudinal section of a somewhat more developed form.

According to the present invention in its broadest aspect the flow meter comprises a Pitot tube placed with its mouth at a radius from the axis of about ¾ of the radius of the pipe section at its location. It will be shown below that the calibration is then practically independent of the Reynolds number; and that the contribution to the total flux of the elementary annulus at this radius is near the maximum, resulting in high sensitivity of the meter.

Such an arrangement is still not free from inaccuracy if the velocity distribution across different diameters of the pipe is asymmetrical. To deal with this, the invention provides a plurality of Pitot tubes with their mouths all at the same radius above specified and symmetrically, preferably equally, distributed round the axis. Then the mean of their readings gives the flow independently of a substantial degree of asymmetry in the velocity distribution. If the several Pitot tubes are separately metered asymmetry can be detected, but where this is not required, they and the corresponding static pressure orifices may respectively be connected together so that only a single manometer is required and a single reading is taken. In the case of marked asymmetry arising say from proximity to a bend or sudden change of section, it will probably be desirable to insert a fine guide vane element or a fine honeycomb element at or behind this, in order to smooth out the disturbance. Swirl may lead to inaccuracy but is likely to be present with asymmetry and will therefore be dealt with by the honeycomb element.

A suitable number of Pitot tubes is four.

In the simplest form of all, the instrument need consist of no more than an accurately turned length 1 of tube of suitable internal diameter to avoid too high or too low a speed or to match an existing pipe 2—2 with a Pitot tube 3a, 3b and a corresponding static hole 4. However as above pointed out preferably a plurality of symmetrically disposed Pitot tubes and static holes are used, and the figures all show arrangements using four Pitot tubes and holes equally distributed round the axis of the tube length 1. In accordance with the invention the axial parts 3a of all the Pitot tubes lie at a radius of approximately ¾R, where R is the radius of the tube 1. The static holes 4 should be at least 10 Pitot tube diameters upstream of the radial part 3b of the Pitot tube, and should be in line with the Pitot tube mouths i. e. in the same plane transverse to the axis of the tube 1, but should lie on diameters offset say 45° from those on which the Pitot tubes 3a, 3b lie to avoid interference as indicated in Figure 2. The static holes 4 can however lie on the same diameters as the Pitot tube mouths if the Pitot tube diameter is small in relation to $R/4$. The unit comprised by the length of tube 1 should extend at least half a pipe diameter ahead and behind the static holes 4 and should fit smoothly in the pipe line 2—2 without leaks. The instrument can be calibrated by carrying out a Pitot traverse of a section of pipe some distance behind the unit.

A more elaborate form would be one in which each of the four Pitot tubes could be traversed by a micrometer from the wall of the pipe to beyond the axis of the pipe. Such an instrument could be accurately calibrated in situ and if necessary the Pitot tubes could be set at such a radius that the calibration constant was unity. A single micrometer adjustment could be provided to adjust the four Pitot tubes simultaneously and equally.

Numerous forms of micrometer adjustment are possible, but by way of example one possible form is shown in Figure 3. Here the radial part 3b of each Pitot tube is long enough to permit the necessary traverse. It carries a half-collar 5 which engages without axial play in a groove 6 in a nut 7 working on a fixed radial micrometer screw 8 secured to the tube 1. The nut has an enlarged head 9 by which it is rotated and the head is graduated and also coacts with a scale 10 whereby the exact radial adjustments can be read off.

A variation of this would be to have only one of the Pitot tubes with a micrometer attachment and to have the unit capable of being rotated and set at 90°, 180° and 270° to its original position.

Figure 3 by way of example shows spigot and socket connections at 11 which would permit such rotation, and these connections can be graduated to indicate the desired settings.

The instrument is especially suitable for high-speed flows because of its negligible loss and the fact that standard corrections for the effect of compressibility can be applied above 200 ft./sec. for gaseous fluids. At low speeds a sensitive gauge will be required and it would seem that a mean speed of about 40 ft./sec. for gases or 2 ft./sec. for liquids of low viscosity is the lowest that is desirable for good accuracy if a Chattock gauge or inclined manometer is used. The Chattock gauge is described for example at page 125 of "Applied Aerodynamics," Bairstow, 2nd edition 1939 (Longmans, London).

There is no upper limit to the pipe diameter provided the Pitot tubes are of such a size as to ensure adequate rigidity and yet are not too large to affect the accuracy of the readings close to the wall. The lower limit will probably be set at a pipe diameter of ½" using the finest hypodermic tubing for the Pitot tubes. This sets for gases a lower quantity flow limit given by the product of a mean speed of 40 ft./sec. into the area of a ½" diameter pipe, which gives a lower limit of about 3 cu. ft./min. For liquids the lower limit is about ⅛ cu. ft./min. The instrument readily lends itself to production in a series of standard pipe diameters.

Small errors in the location of the Pitot tube mouths at ¾R will not result in serious errors in quantity per sec. Precision alignment of the Pitot tubes with the pipe axis is not required, though it is as well to aim at it. Static holes should be as small as possible consistent with freedom of movement of the manometer liquid. They should be carefully finished to avoid burrs.

The Pitot tubes may conveniently be made of nickel or stainless steel to prevent corrosion. Care must be taken to see that moisture does not condense in tubes of small diameter. This is a frequent and unsuspected source of trouble; it is readily cleared by applying gentle heat. If used in liquids care should be taken to get rid of all air bubbles in the Pitot and static connections.

Dust or soot laden airstreams may be expected to choke fine Pitot tubes ultimately, and so may prevent the use of the instrument with the usual arrangement of the Pitot tubes pointing upstream. However, it may be feasible to point the tubes downstream and to calibrate them for this arrangement.

The empirical formula $$\frac{u}{U_1} = \left(\frac{y}{R}\right)^{\frac{1}{m}}$$

for the velocity distribution across the pipe section, where $u$ is the velocity at any radius, $U_1$ is the velocity on the axis, $R$ is the pipe radius, $y$ is the distance from the wall and $m$ a constant depending on the Reynolds number, gives a good approximation if $m$ is taken as 7 for medium Reynolds numbers, and 8, 9 etc. for higher Reynolds numbers. Mathematical investigation based on the formula shows that if the Pitot tubes are located at $r/R=¾$ a calibration constant of approximately unity can be obtained for a wide range of values of $m$, in particular for $m$ greater than 4 and less than 10 the error is not above ±½ per cent. For $m$ greater than 10 the error is less than this. It also shows that this position is reasonably close to the maximum value of $ur$, i. e. of the elementary annulus making the maximum contribution to the flow, the actual maximum varying from $r/R=¾$ for $m=3$ to $r/R=⅞$ for $m=7$.

These conclusions are also borne out by practical test. The meter in these tests consisted of four 0.035 inch diameter hypodermic tube Pitots in a 2 inch diameter pipe. Except at low speeds, the calibration curve is so nearly flat that a constant calibration factor of 0.992 gives results within ±0.6 per cent over the whole speed range from 100 to 450 feet per second. Further tests on the effect of bends show that after a sharp, mitred right angle bend, a settling length of 6 diameters suffices, while after a 105° bend of radius on the centre line of 1 pipe diameter, a settling length of 9 diameters suffices to obtain reliable results. They also show that the calibration varies little for settling lengths above 15 diameters.

I claim:

1. A Pitot tube type flow meter including a pipe section and plurality of Pitot tubes located symmetrically about the axis thereof and all at approximately three-quarters of the radius of the pipe section from the axis thereof, said pipe section having static pressure openings in the wall thereof displaced about the axis of the pipe section to bring them substantially midway between the Pitot tubes and located at least ten Pitot tube diameters upstream of the radial parts of the Pitot tubes.

2. A Pitot tube type flow meter as set forth in claim 1, wherein the Pitot tubes are equally spaced round the axis of the pipe section.

3. A Pitot tube type flow meter comprising a pipe section, four Pitot tubes located 90° apart about the axis of said pipe section and all at approximately ¾ of the radius of the said pipe section from the axis thereof said pipe section having static pressure holes located in the walls thereof at least 10 times the diameter of the Pitot tubes upstream of the radial parts of said Pitot tubes.

4. A Pitot tube type flow meter comprising a pipe section, a plurality of Pitot tubes located symmetrically about the axis of said pipe section, all of said Pitot tubes being located at approximately ¾ of the radius of the said pipe section from the axis thereof said pipe section having static pressure holes located in the wall thereof radially offset from the mouths of the Pitot tube and at a distance upstream from the radial parts thereof of at least 10 times the diameter of the Pitot tubes.

5. A Pitot tube type flow meter as set forth in claim 4 wherein there are four Pitot tubes located 90° apart round the axis of the pipe section and the static pressure holes are radially offset by 45° from the radial parts of said Pitot tubes.

6. A Pitot tube type flow meter as set forth in claim 4, wherein the static pressure holes are located in the transverse plane containing the mouths of said Pitot tubes.

7. A Pitot tube type flow meter comprising a pipe section, and a plurality of Pitot tubes located symmetrically about the axis thereof and all at approximately ¾ the radius of the pipe section from the axis thereof, said pipe section having static pressure openings in the wall thereof at least ten times the diameter of the Pitot tubes upstream of the radial parts of said Pitot tubes.

References Cited in the file of this patent

UNITED STATES PATENTS

| 1,492,939 | Royer | May 6, 1924 |
| 1,645,449 | Proebstel | Oct. 11, 1927 |
| 2,061,198 | Kohut | Nov. 17, 1936 |
| 2,101,165 | Cole et al. | Dec. 7, 1937 |
| 2,260,019 | Gentile | Oct. 21, 1941 |

FOREIGN PATENTS

| 405,986 | Germany | Nov. 15, 1924 |